(12) United States Patent
Enomura (10) Patent No.: US 6,517,077 B1
(45) Date of Patent: Feb. 11, 2003

(54) MECHANICAL SEAL, AND AGITATING DEVICE AND PROCESS USING SAME

(75) Inventor: Shinichi Enomura, Osaka (JP)

(73) Assignee: M. Technique Co., Ltd., Osaka (JP)

( * ) Notice: Subject to any disclaimer, the term of this patent is extended or adjusted under 35 U.S.C. 154(b) by 0 days.

(21) Appl. No.: 09/385,839

(22) Filed: Aug. 30, 1999

(30) Foreign Application Priority Data

Jul. 5, 1999 (JP) .......................................... 11-190332

(51) Int. Cl.[7] ................................................ F16J 15/34
(52) U.S. Cl. ...................... 277/358; 277/370; 277/377; 277/387
(58) Field of Search .................. 277/358, 370, 277/371, 372, 374, 375, 373, 377, 379, 380, 387, 388

(56) References Cited

U.S. PATENT DOCUMENTS

| | | | | |
|---|---|---|---|---|
| 1,020,210 | A | * | 3/1912 | Lobnitz ....................... 277/369 |
| 3,433,489 | A | * | 3/1969 | Wiese |
| 3,506,276 | A | * | 4/1970 | Petersen et al. |
| 3,582,089 | A | * | 6/1971 | Franklyn |
| 3,589,738 | A | * | 6/1971 | Herbert |
| 3,813,103 | A | * | 5/1974 | Wiese |
| 4,174,843 | A | * | 11/1979 | Arena et al. |
| 4,523,764 | A | * | 6/1985 | Albers et al. |
| 4,961,678 | A | * | 10/1990 | Janocko |
| 5,171,023 | A | * | 12/1992 | Scott et al. |
| 6,142,478 | A | * | 11/2000 | Pecht et al. |

FOREIGN PATENT DOCUMENTS

JP                689872           11/1994

* cited by examiner

Primary Examiner—Anthony Knight
Assistant Examiner—Vishal Patel
(74) Attorney, Agent, or Firm—Birch, Stewart, Kolasch & Birch, LLP (57) ABSTRACT

The invention relates to a mechanical seal that may control the pressure between sliding faces of sliding rings in the mechanical seal portion and also clean and sterilize the sliding faces reliably, and an agitating device and process using the mechanical seal. The rotary ring rotatable together with the revolving shaft and the fixed ring disposed opposite to said rotary ring on the agitating tank side include controlling mechanisms for controlling the pressure or the gap between both sliding faces respectively. Said controlling mechanism is a piston placed within the cylinder provided in the casing, and positive or negative pressure is applied through said piston to the fixed ring for control of the pressure between the sliding faces by changing the pressure of fluid such as air supplied into the cylinder. In cleaning and sterilizing operations, negative pressure is used to open the gap between the sliding faces to allow passage of cleaning liquid or steam for sterilization between both sliding faces.

9 Claims, 8 Drawing Sheets

MECHANICAL SEAL, AND AGITATING DEVICE AND PROCESS USING SAME

BACKGROUND OF THE INVENTION

The present invention concerns improvements to the mechanical seal, and agitating device and process using same.

Mechanical seals are often used as a typical seal structure for use in rotary apparatuses. For example, if fluid is agitated in the agitating tank, rotary blades built in the agitating tank are rotated by means of a revolving shaft with its leading end portion received by the agitating tank, and the perimeter of the revolving shaft is rendered reliably liquidproof by the mechanical seal.

The pressure between the sliding faces of sliding rings in the mechanical seal greatly affects the sealability and the resistance to rotation of the revolving shaft. This pressure tends to fluctuate under the influence of various factors such as pressures of sealing fluid, spring, flushing liquid, etc.

More specifically, the flushing fluid is intended to be introduced into a seal box (stuffing box) as in order to cool the sliding rings. As the pressure of the flushing fluid increases, the pressure between the sliding faces tends to decrease. In this connection, for example, if the rotary speed of the revolving shaft is needed to increase, there is a limit to speeding up of the revolving shaft in terms of the flushing liquid. More specifically, it is necessary to increase the flow rate of flushing liquid for the purpose of cooling of the sliding rings as the revolving shaft is turned at higher speeds. The more the flow rate of flushing liquid, the higher the pressure of the flushing liquid, followed by the decrease of the pressure between the sliding faces. Since lowering of the pressure between the sliding faces may create liquid leaks, there would inevitably be a limit to the speed up of the revolving shaft in association of the flow rate of flushing liquid or the fluid pressure.

Desired pressure between the sliding faces is dependent on the pressures of a seal fluid used. Therefore, the mechanical seal is designed based on the pressure of the seal liquid being used that has been set within a predetermined range. If said pressure happens to deviate from the range, there would occur harmful effects such as liquid leaks, or increase of resistance to rotation.

In order to cope with such a problem, as the case may be, pressure-equalizing tubes are used to change the pressure of flushing liquid in response to the pressure change of seal fluid. However, such a solution needs to establish complicated requirements in connection with the rotary speed of the revolving shaft.

Many mechanical seals incorporate a spring acting to bias the sliding rings. The strength of said spring is designed in consideration of manifold factors. So, theoretically, the pressure between the sliding faces can be altered by changing the strength of spring. However, it is awfully difficult to change the spring strength into an adequate value in the mechanical seal fabricated from specific design. Particularly, it is safe to say that in operation, it is impossible to manipulate the spring in its inherent elasticity on the sliding rings.

On the other hand, nowadays, in the drugs or food industry, sterilization treatment must often be performed concurrently with the agitation treatment for fluid. In such a case, it is also necessary to clean and sterilize the mechanical seal in order to keep the interior of the agitating tank sterilized. In the past, such cleaning and sterilization operations had to be carried out after the mechanical seal had been disassembled. However, processes for performing cleaning or sterilization without disassembly, which are called CIP (cleaning in position) or SIP (sterilization in position) are becoming the mainstreams of today.

For example, Japanese Patent Publication No. 6-89872 proposed a process for keeping the sterilization medium constituted by a section surrounding the mechanical seal portion sterilized by subjecting this sterilization medium to sterilization by steam or introducing sterilized water into said medium.

However, said proposal has a problem that because the sliding faces of sliding rings in the mechanical seal portion are subjected to force fit by a predetermined pressure, steam never reaches the gap between the sliding faces, with the result that a complete sterilization can not be made. In cleaning only or in conjunction with sterilization also lies a similar problem.

Cleaning liquid, sterilization liquid, liquefied steam (water), or cooling liquid used for cooling the mechanical seal in operation may partially collect in the passage. Such a liquid pool is called "cold point". Liquid gathered in this cold point may be an obstacle to reliable sterilization at the time when further sterlization takes place. In particular, the sterilization requirement on the basis of SIP needs passage of pure steam at a temperature higher than 121° C. for 20 minutes in order to sterilize the mechanical seal portion. However, if the introduced pure steam gets in touch with liquid such as water gathered in the cold point, the temperature of the pure steam will go down, thereby failing to meet said sterilization requirement.

An object of the present invention is the provision of a mechanical seal that may readily control the pressure between the sliding faces of sliding rings, and an agitating device and process using the mechanical seal.

Further object of the present invention is to widen the pressure range for seal liquid and the range of the rotary speed of revolving shaft in which the mechanical seal can be suitably used, by the provision of the mechanical seal enabling the pressure control between the sliding faces.

Further object of the present invention is to provide a mechanical seal that may control the pressure between the sliding faces in operation.

Another object of the present invention is to provide a mechanical seal, and an agitating device and process using same, in which a reliable cooling and sterilization of the sliding faces of sliding rings in the mechanical seal portion can also take place.

Further object of the present invention is to provide a mechanical seal, and an agitating device and process using same, in which a reliable sterilization may be carried out without creation of liquid pools (cold points) which constitute an obstacle, especially, to sterilization through steam.

BRIEF SUMMARY OF THE INVENTION

A first invention of the present application provides a mechanical seal for building a liquid seal between a plurality of sliding rings 2, 3 opposed and rotatable relatively, namely sliding faces 2a, 3a of said opposed sliding rings 2, 3, characterized in that it includes controlling mechanisms 6, 53 of controlling force to bias at least one 3 of these sliding rings 2, 3 against the other one 2, so that the pressure or the gap between the sliding faces 2a, 3a of the opposed sliding rings may be controlled. Said controlling mechanism is capable of controlling the pressure or the gap between the sliding faces 2a, 3a regardless of the pressure of seal fluid or flushing liquid, or within the range wider than the range in which the pressure between the sliding faces may be changed by the seal fluid or flushing liquid.

A second invention of the present application provides the mechanical seal in accordance with the first invention, characterized in that at least one sliding ring 3 is pressed against the other sliding ring 2 by an elastic body, and that said controlling mechanisms 6, 53 act to control the biasing force by applying force in the direction in which the pressing force due to said elastic body goes, or counter to said pressing force. In many conventional mechanical seals, one sliding ring 3 is pressed toward another sliding ring 2 by means of the elastic body. In this invention, the pressure or the gap between the sliding faces 2a, 3a can be controlled by applying force in the direction in which the pressing force goes or counter to said direction.

A third invention of the present application provides the mechanical seal in accordance with the first or second invention, characterized in that said controlling mechanisms 6, 53 serve to apply positive or negative pressure of control liquid to at least one sliding ring 3 in an axial direction of the revolving shaft of the mechanical seal. In this invention, the biasing force can be controlled by changing the pressure of control seal fluid by applying the pressure of the positive or negative control seal fluid in an axial direction of the revolving shaft of the mechanical seal. In operation as well as at rest, the control of the pressure or the gap between the sliding faces 2a, 3a can be achieved, too.

A fourth invention of the present application provides the mechanical seal in accordance with any of the first through third inventions, characterized in that it has a mechanism of supplying flushing liquid to the sliding rings 2, 3, that said controlling mechanism 6 controls biasing force by applying pressure of the control fluid to at least one sliding ring 3, and that the passage of control fluid in said controlling mechanism is independent of the passage for flushing liquid. With this invention, because the passage for control fluid is independent of the passage for flushing liquid, the pressure or the gap between the sliding faces 2a, 3a can be controlled irrespective of the flushing liquid. Flushing liquid is feared to leak on the seal fluid side in the agitating tank, and the passage for flushing liquid in the seal box may need cleaning and/or sterilization in accordance with CIP (cleaning in position) and/or SIP (sterilization in position). the provision of a passage for control fluid that is independent of the passage for flushing liquid and the breaking of communication between both passages may avoid the necessity of cleaning and sterilizing the passage for control fluid.

A fifth invention of the present application provides the mechanical seal in accordance with any of the first through fourth inventions, characterized in that said controlling mechanism 6 includes a piston 6 serving to move at least one sliding ring 3 to or away from the other sliding ring 2, so as to control biassing force by applying fluid pressure to said piston 6. In this invention, by exactly transmitting fluid pressure to the sliding rings via the piston 6, the reliable control of the pressure or the gap between the sliding faces 2a, 3a can be realized.

A sixth invention of the present application provides the mechanical seal in accordance with the fifth invention, characterized in that at least one sliding ring 3 is pressed by the elastic body toward the other sliding ring 2, and that the force of said elastic body may be transmitted to the one sliding ring 3 through said piston 6. In this invention, by transmitting combination of the pressure of the elastic body and the fluid pressure to the sliding rings via the piston 6, the reliable control of the pressure or the gap between the sliding faces 2a, 3a can be realized.

A seventh invention of the present application provides a mechanical seal comprising revolving shaft 1, sliding ring 2 which may rotate together with said revolving shaft 1, and sliding ring 3 disposed opposite to the sliding ring 2 in order to build a liquid seal between the sliding faces 2a, 3a of both sliding rings, characterized in that said controlling mechanism 53 comprises a first chamber 52 provided on the rear side of the sliding ring 3, a second chamber 54 enclosed by both sliding rings 2, 3 and revolving shaft 1, an orifice 53 acting to establish communication between said first and second chambers 52, 54, a first passage 51 of introducing fluid into the first chamber 52, and a second passage 55 of discharging fluid from the second chamber 54, and that the pressure or the gap between the sliding faces 2a, 3a of the opposed sliding rings may be reduced or widened by dropping fluid pressure in the first chamber 52 to a lower level than that of fluid pressure in the second chamber 54 to let control fluid flow from the first passage 51 to the first chamber 52, the orifice 53, the second chamber 54, and the second passage 55 in this order. In this invention, the pressure or the gap between the sliding faces 2a, 3a of the opposed sliding rings can be reduced or widened by the differential pressure between the first and second chambers 52, 54 with the orifice 53 contained by both chambers.

An eighth invention of the present application provides the mechanical seal in accordance with any of the first or seventh invention, characterized in that the control fluid also acts as flushing liquid, that the controlling mechanism 53 is embodied by orifice 53 formed in the passage for flushing liquid, and force directed toward the other sliding ring 2 is applied to the one sliding ring 3 by differential pressure caused by said orifice 53, and that the pressure or the gap between the sliding faces 2a, 3a of the opposed sliding rings may be reduced or widened by changing the flow rate of the flushing liquid. The provision of the orifice 53 makes it possible to carry out the pressure control through a bigger amount of change than the change of the pressure of flushing liquid, and reverse of the differential pressure originated from the orifice 53 can also produce corresponding reverse of flushing liquid flowing in a direction of the orifice 53.

A ninth invention of the present invention provides the mechanical seal in accordance with any of the first through eighth inventions, characterized in that with the pressure or the gap between the sliding faces 2a, 3a of the opposed sliding rings kept reduced or widened under the influence of said controlling mechanism 53, cleaning and sterilization of the sliding faces 2a, 3a may be achieved. In the mechanical seal, the sliding faces 2a, 3a of the sliding rings are usually stuck together. Therefore, the opposed sliding faces 2a, 3a were difficult to clean or sterilize unless disassembled. In this invention, however, by reducing or widening the pressure or the gap between the sliding faces 2a, 3a of the opposed sliding rings using the controlling mechanism 53, fluid such as steam can be passed between the sliding faces 2a, 3a without process of disassembly, thereby enabling cleaning or sterilization of the sliding faces in just the state they usually are in.

A tenth invention of the present application provides an agitating device comprising revolving shaft 1 movable by power drive such as an electric motor 102, an agitating tank 103 of receiving the leading end of said revolving shaft 1, and an agitating member 105 provided on the leading end of said revolving shaft 1 received by the agitating tank 103, characterized in that the mechanical seal in accordance with any of the first through ninth inventions is located between the agitating tank 103 and the revolving shaft 1, and the one sliding ring of said mechanical seal is provided as sliding ring 3 on the agitating tank side while the other sliding ring is provided as sliding ring 2 on the revolving shaft side in such a manner that biassing force as adjusted by control fluid will be applied to any of both sliding rings.

In this invention, if change in pressure of fluid within the agitating tank occurred, the pressure or the gap between the sliding faces 2a, 3a of sliding rings can be controlled by the controlling mechanism of the mechanical seal. The sliding faces 2a, 3a can be also cleaned or sterilized together with the agitating tank without procedure for disassembly. Incidentally, the wording "agitation" used in the inventions of this application is a concept involving not only agitation itself but also mixing, emulsification, and dispersion.

An eleventh invention of the present invention provides the agitating device in accordance with the tenth invention, characterized in that said mechanical seal includes passages 51, 52, 53, 54, 55, 56, 57 for sterilization or cleaning, that said passages for sterilization or cleaning also act as passage for flushing liquid respectively, and that these passages are so inclined as to avoid formation of liquid pools therewithin, communicating with at least an inlet port 51a or outlet port 57a.

In this invention, any formation of liquid pools or cold points within the passages can be prevented to ensure that reliable sterilization will be obtained.

A twelfth invention of the present application provides the agitating device in accordance with the eleventh invention, characterized in that the sliding ring 3 is provided on the wall 104 of the agitating tank 103, and the sliding ring 2 is provided on the leading end side of the revolving shaft 1 received by the agitating tank 103, so that the sliding ring 2 is positioned more inwardly of the agitating tank 103 than the sliding ring 3, whereby the biassing force adjusted by control fluid which is introduced from the outside of the agitating tank 103 is applied to the sliding ring 3.

In this invention, biassing force controlled by control fluid from the outside of the agitating tank 103 is applied to the sliding ring 3 on the fixed part, and the biassing force may be adjusted independent of the pressure inside the agitating tank 103, thereby controlling the pressure or the gap between the sliding faces 2a, 3a.

A thirteenth invention of the present application provides a rotary apparatus including revolving shaft 1 movable by power drive such as electric motor 102, characterized in that the mechanical seal in accordance with any of the first through ninth inventions is used as a seal to prevent entry of liquid seal occurring around the revolving shaft 1.

The mechanical seal in accordance with the inventions of the present application is also usable with pumps or centrifugals in addition to the agitating device. In particular, if the mechanical seal is utilized in the rotary apparatus such as agitating device, pump, centrifugal, etc., workable in fluid passages which require CIP (cleaning in position) or SIP (sterilization in position), more reliable CIP (cleaning in position) or SIP (sterilization in position) can be put into practice. Even though CIP (cleaning in position) or SIP (sterilization in position) never takes place, it is useful to the control of the pressure between the sliding faces. Moreover, this specific mechanical seal is widely applicable to various kinds of rotary apparatus which need the provision of seal around the shaft or spindle, except the rotary apparatus as illustrated above.

A fourteenth invention of the present application provides an agitating process characterized in that when the agitating device in accordance with any of the tenth through twelfth inventions is used to agitate materials to be agitated in the agitating tank 103 of said agitating device, agitation is carried out with the sealability acceptable for the gap between the sliding rings 2, 3 retained at a higher level by urging control fluid forward and that if the mechanical seal is subjected to cleaning and sterilization when no agitation takes place, sterilizing liquid or cleaning liquid is passed through the sliding faces 2a, 3a of the opposed sliding rings with the pressure or the gap between the sliding faces 2a, 3a of the opposed sliding rings kept reduced or widened by reducing the flow of control fluid or stopping the control fluid from flowing.

In this invention, the sterilization and cleaning fluids are passed between the sliding faces 2a, 3a of the opposed sliding rings with the pressure or the gap between the sliding faces 2a, 3a of the opposed sliding rings reduced to a low level or widened to ensure that the sliding faces 2a, 3a will be reliably cleaned and sterilized.

DETAILED DESCRIPTION OF THE PREFERRED EMBODIMENTS

Now, the embodiments of the present invention will be described with reference to the drawings.

Figure 1:
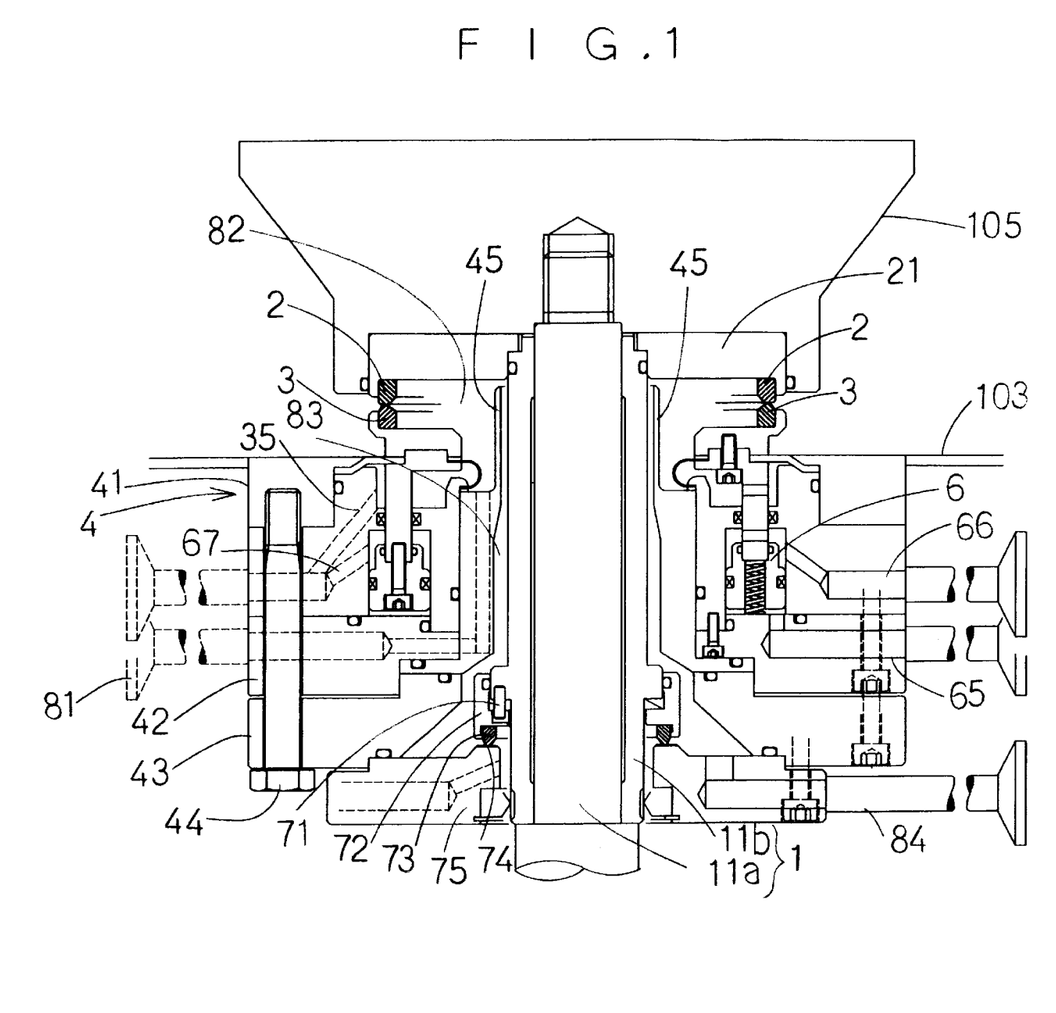
FIG. 1 is a cross sectional view of the mechanical seal in accordance with a first embodiment of the present invention.
Figure 2:
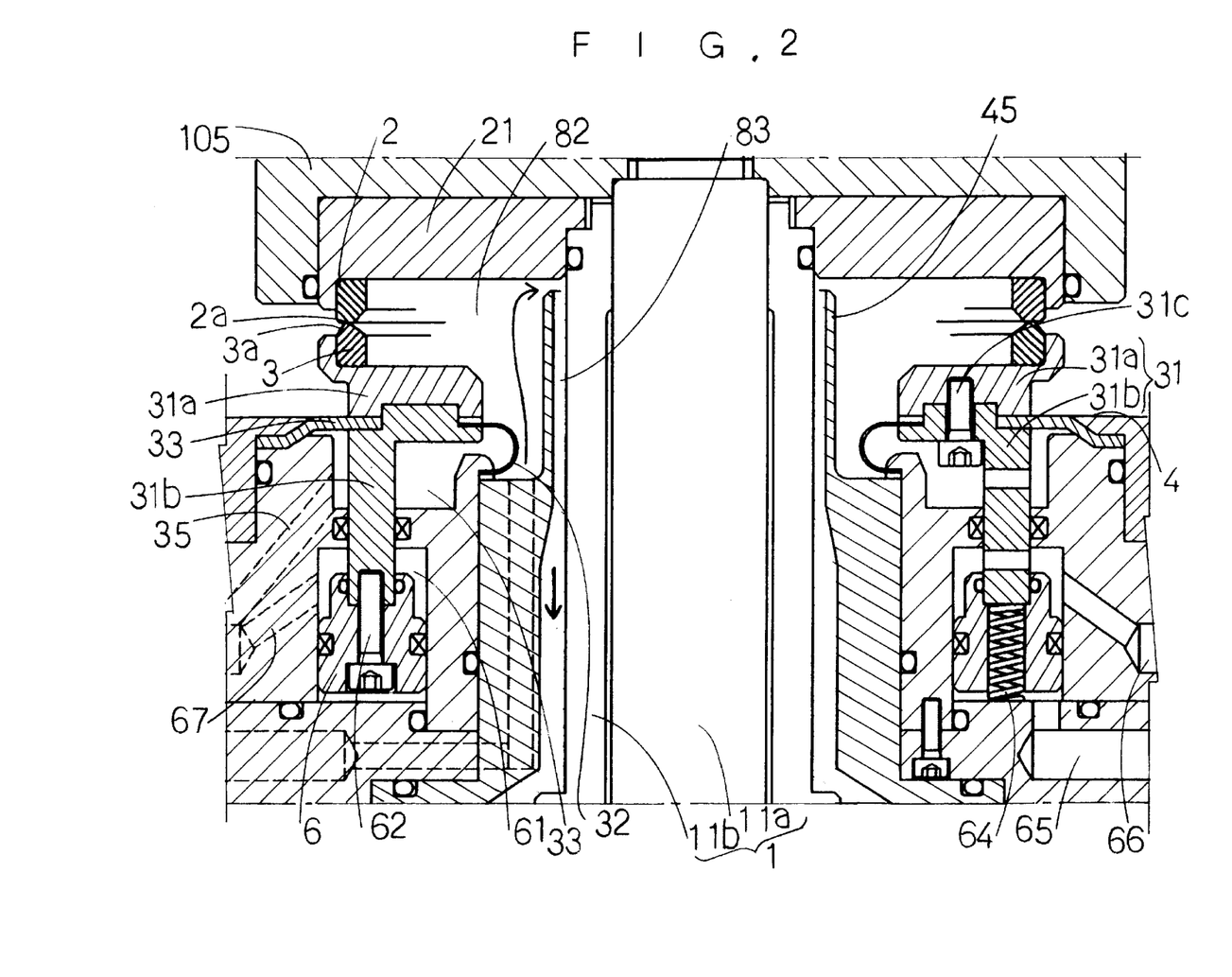
FIG. 2 is an enlarged view of the principal part of same.
Figure 3:
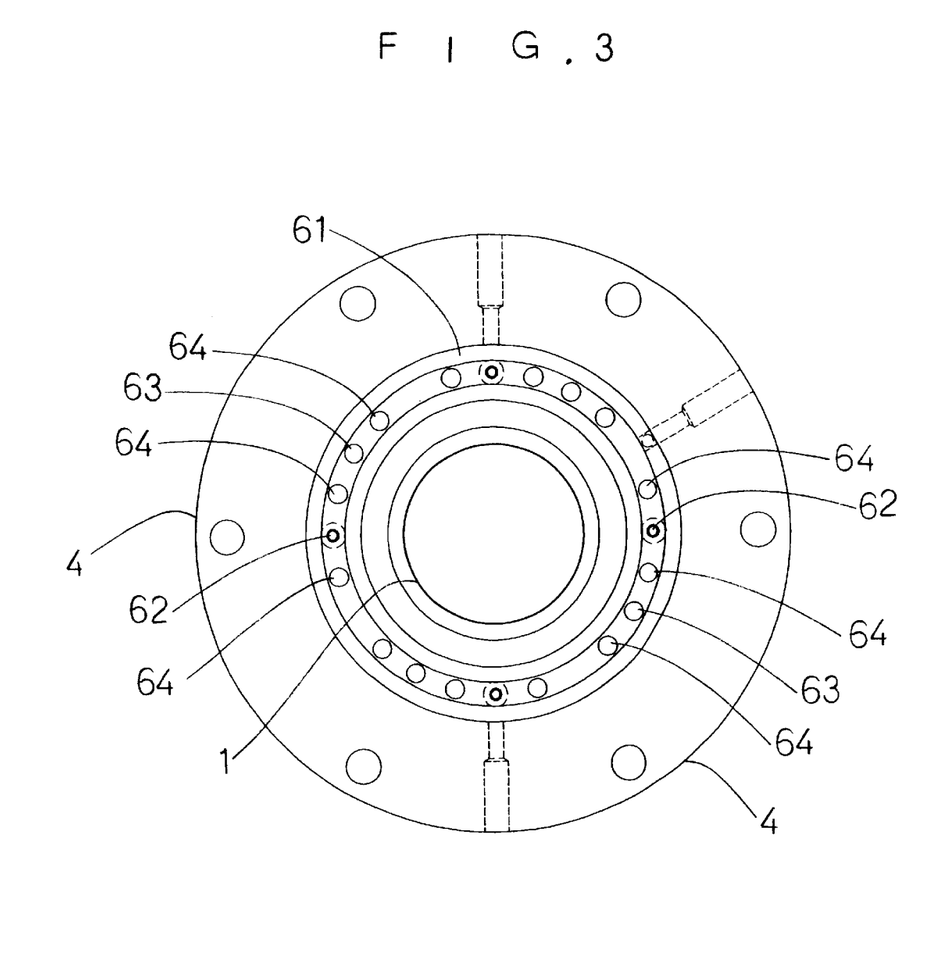
FIG. 3 is a plan view of the cylinder of said mechanical seal.
Figure 4:
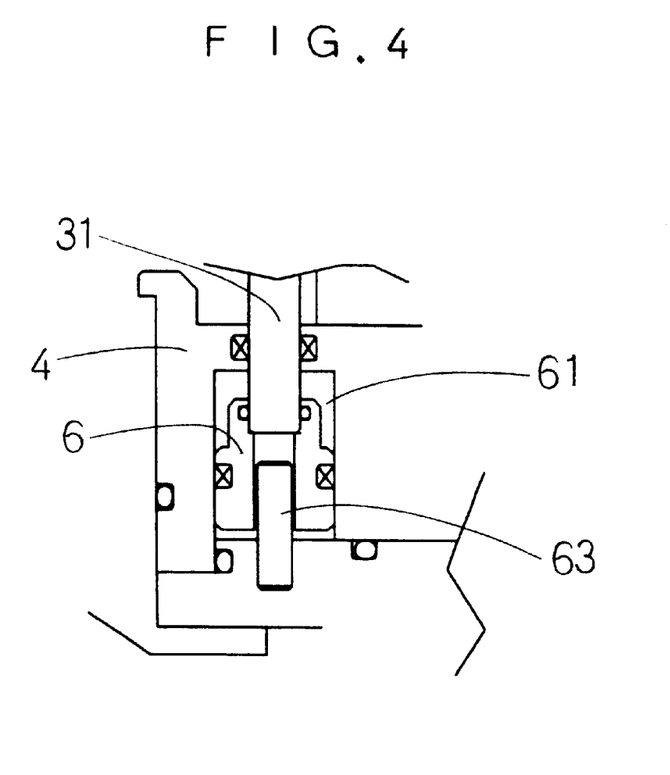
FIG. 4 is a cross sectional view of the principal part showing the guiding structure between the casing and piston of said mechanical seal.
Figure 5:
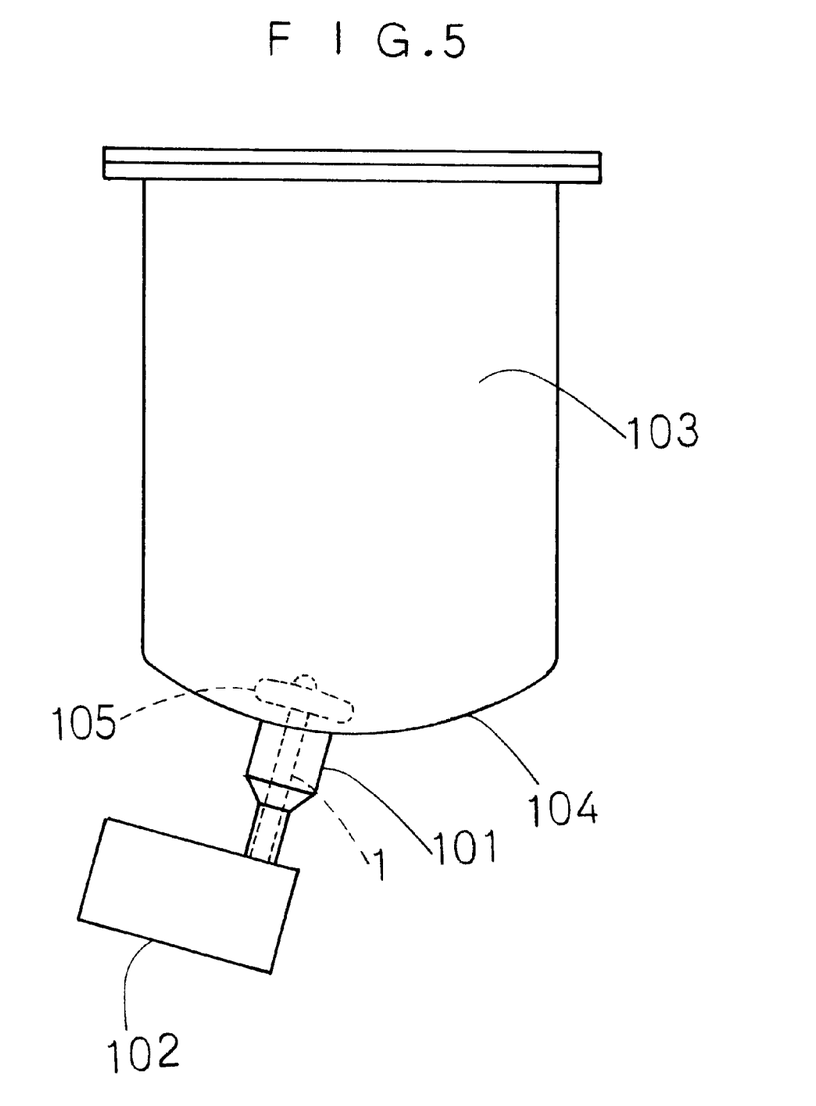
FIG. 5 is a view of the entire agitating device provided with said mechanical seal.

FIG. 1 is a cross sectional view of a mechanical seal in accordance with the embodiment of the present invention, FIG. 2 an enlarged view of the principal part of same, FIG. 3 a view explanatory of the planar structure of said mechanical seal, FIG. 4 a cross sectional view showing the arrangement of making an unrotatable connection between the casing of the mechanical seal and the piston, and FIG. 5 a view showing the entire agitating device provided with said mechanical seal.

As shown in FIG. 5, the mechanical seal 101 in accordance with this embodiment is intended to build a seal between the revolving shaft urged by a power drive such as electric motor 102 and the wall 104 of an agitating tank 103, and is positioned close to the bottom of the agitating tank 103. In this invention, "agitation" is used as a wording involving not only "agitation" in the narrow sense, but also homogenizing treatment for emulsified or mixed fluid.

As shown by FIG. 1, said revolving shaft 1 comprises a shank 11a, and a shell 11b secured onto the entire outer periphery thereof. Since both members 11a, 11b are formed integral with each other, the combination of 11a and 11b will be designated and explained as revolving shaft 1 afterward, unless specifically needed. Said revolving shaft 1 has a leading end portion received by the agitating tank 103 and agitating members such as agitating blades threadedly engaged with the leading end portion. Referring to members as described later on, it will be noted that, in principle, what is shown in the upper side of the drawings (the side on which the agitating blades 105 of the revolving shaft 1 are mounted) is taken as the leading end side, and what is shown in the lower side (the side on which the electric motor 102 is mounted) as the base end side.

The mechanical seal 101 comprises a sliding ring 2 rotatable solidly with the revolving shaft 1 and positioned on the moving part (hereafter referred to as rotary ring) and a sliding ring 3 disposed opposite to the rotary ring 2 and positioned on the fixed part (hereafter referred to as fixed ring 3). When the rotary ring 2 and fixed ring 3 are referred to together, they will be called sliding rings 2, 3 generically.

Both sliding rings 2, 3 are a pair of rings which are opposed to each other so that sliding faces 2a, 3a may rotate relative to each other when at least one of the rings (rotary ring 2 in this case) rotates. The rotary ring 2 is here disposed inside the agitating tank 103, while the rotary ring 3 is placed on the side of the casing 4 of the mechanical seal 101 which is mounted outside the agitating tank 103. This casing 4 has the revolving shaft 1 and the sealed portion of the mechanical seal disposed inside thereof. In this instance, a single casing 4 is constituted by joining a plurality of members together with a bolt. Such a structure may be modified properly. These multiple members will be designated as casing 4 unless specifically needed.

Said rotary ring 2 is supported by a covering 21 provided on the leading end of the revolving shaft 1. More specifically, the rotary ring 2 is mounted integrally on the base end of the covering 21 through a proper fixing means such as a check pin, with the sliding face 2a looking toward the fixed ring 3 located on the base end side. The covering 21 is arranged such that the rotary ring 2 is mounted in a manner that it is rotatable together with the revolving shaft 1, and serves to keep liquidtight between both members 1, 2. Although the covering 21 and agitating blades 105 are here threadedly engaged with each other, they may be made separately and set with a gap between them.

The fixed ring 3 is placed on the base end side of the rotary ring 2. More specifically, the fixed ring 3 is positioned at the top end of the casing 4 mounted outside the agitating tank 103, and which top end facing the interior of the agitating tank 103. Said fixed ring 3 is arranged such that it is slidable and unrotatable in an axial direction of the casing 4.

More specifically, the fixed ring 3 is provided in the top end of a tubular support member 31 which is provided slidably relative to the casing 4. In this embodiment, said tubular support member 31 is divided into a first support portion 31a on the leading end side and a second support portion 31b on the base end side, both support portions being joined together by a proper means such as screw 31c, but both support portions 31a, 31b may be varied properly in structure, as by forming them integrally. Both support portions 31a, 31b will be explained as support member 31 later, unless specifically needed. The support member 31 may be formed integral with the fixed ring 3. Such a solid structure may be taken as a fixed ring as a whole, in terms of the technological ideas.

The support member 31 of the fixed ring 3 can be moved by the piston in a vertical direction. Namely, the pressure or gap between the sliding faces (2a, 3a) of the fixed ring 3 and the rotary ring 2 may be controlled by moving the fixed ring 3 toward or away from the rotary ring 2 through the piston 6. This specific piston 6 is a controlling mechanism as defined in the claims.

The piston 6 is arranged slidably in an axial direction in a cylinder 61 formed within the casing 4. In this instance, the cylinder 61 is a hollow configured in a tubular form within the casing 4 around the revolving shaft 1, and the piston which makes a sliding motion in a close touch with the inner wall of the cylinder 61 is also of a follow configuration. The piston 6 and the support member 31 are secured to each other by the screw 62 in a manner that they may axially slide together. The piston 6 is designed unrotatable relative to the casing 4. As shown in FIG. 3, the connection of the piston 6 and the casing 4 in a unrotatable and axially slidable manner is based on a guide pin 63 which rests across the space between both elements. Such an unrotatable relation between the casing 4 and the piston 6 renders the fixed ring 3 unrotatable relative to the casing 4. There is disposed an elastic body 64 between the piston 6 and the cylinder 61 so as to press the piston 6 (and the fixed ring 3 as well) against the rotary ring 2. Here, the elastic body 64 is a spring (compression coil spring), but other type of elastic body may be used, and the number of elastic body 64 used may be one or more. A tension spring may be used to bias the piston 6 so as to pull it up.

The piston 6 may achieve the aforementioned function as controlling mechanism by running in an axial direction by the aid of the pressure of a control fluid such as air, water, or oil. Pressure control between both sliding rings 2, 3 may be performed by applying positive or negative fluid pressure into the cylinder 61 for application of pressure to the piston 6. In this instance, a fluid passage 65 for use in increase of pressure is provided extending from the piston 6 to the base end side within the cylinder 61. The pressure applied between the sliding faces may be increased by introducing fluid from the fluid passage for pressure increase to the base end side of the piston 6. As described above, because the sliding rings are always kept biassed by the elastic body 64, controlling of the pressure within the fluid passage for pressure increase may increase the pressure between the sliding faces to a higher level than the elastic body 64 does. On the other hand, there is provided a fluid passage 66 for use in decrease of pressure extending from the piston to the leading end side. The introduction of a fluid from said fluid passage 66 for pressure decrease to the base end side of the piston 6 may cause decrease of the pressure between the sliding faces, or widening of the gap between the sliding rings 2, 3. In this instance, because the sliding rings are always kept biassed by the elastic body 64, controlling of the pressure within the fluid passage for pressure decrease may decrease the pressure between the sliding faces to a lower level than the elastic body 64 does. In any of the cases, a fluid supply device (not shown) is connected with the fluid passage 65 for pressure increase and the fluid passage 66 for pressure decrease to supply fluid to both fluid passages. In order to apply a desired fluid pressure, there may be added a pressure gauge or a fluid supply circuit having the pressure control function. In this instance, air is used as control fluid, but other fluids such as oil, water or other fluid may be used.

Impression of negative fluid pressure may be achieved by absorbing a fluid from the fluid passages 65, 66 respectively. In the event of change in the pressure conditions, if there remains some of the fluid pressure which has been introduced from the respective fluid passages 65, 66, there is a risk of obtaining no accurate operation. Therefore, there may be added a discharge passage 67 for discharging fluid, if it's necessary.

With the present embodiment, as in many conventional mechanical seals, flushing liquid may be used for cooling the sliding rings 2, 3. This flushing liquid and said control fluid are adapted to pass through the separate passages. Specifically, flushing liquid from a flushing inlet port 81 enters into the inner space 82 of the sliding rings 2, 3, passing through the space 83 between the revolving shaft 1 and a cylindrical body 45 placed around the latter, and going out of a flushing outlet port 84 via a second mechanical seal portion as will be described below.

In accordance with the present embodiment, there is provided a mechanical seal of double type which includes the second mechanical seal portion. The second mechanical seal is the same as the conventional types. In brief, a spring 71, a compression ring 72 which is biassed by the spring 71, and a seal ring 73 attached to the compression ring 72 are provided on the revolving shaft side, and a maintaining ring 74 opposed to the seal ring 53 to do sealing job and an end ring 75 of supporting the maintaining ring 74 are provided on the casing 4 side so that a seal is built between the seal ring 73 and maintaining ring 74. However, here, since the maintaining ring 74 is formed by coating the end surface of the end ring 75 with ceramic, both rings 74, 75 can work as a single member ostensibly. A tandem type except said double type is also usable. Even in that case, a second mechanical seal of a type in which baissing can be done by a spring of conventional type may be employed. As in the present invention, the fluid may be used as controlling means for biassing force. In this instance, the mechanical seal in accordance with the present invention is arranged on the leading end side (within the tank), while the conventional second mechanical seal is placed on the base end side (atmospheric side), but such a positional relation may be reversed. In this embodiment, though the rotary ring 3 which is rotatable together with the revolving shaft is designed not to move axially, it may be so modified as to be movable in an axial direction. Though the rotary ring 2 rotatable together with the revolving shaft 1 is designed not to move axially, it may be so changed as to be movable in an axial direction. Similarly, unrotational fixed ring 3 can move axially, but it may be so changed as not to move in an axial direction, either. Here, controlling means is provided in the fixed ring 3, but such a means may be mounted on at least one of both sliding rings 2, 3.

Next, the agitating device using the mechanical seal and the using method for the device will be explained. The agitating device has said mechanical seal 101 mounted in the agitating tank 103. As a seal is being built between the revolving shaft 1 and the tank wall 104, the agitating blades 105 are driven for rotation by power drive such as the electric motor 102 to mix and agitate materials being agitated. The passage for flushing liquid may also serve as a passage for sterilization and cleaning.

A series of passages are designed to prevent any formation of liquid pools thereinside. In particular, in this instance, a shielding is provided to prevent intrusion of flushing liquid or sterilizing and cleaning fluids between the support member 31 and casing 4. Specifically, shielding bodies 32, 33 are stretched from the support member 31 to the casing 4. The shielding bodies 32, 33 are preferably made of shrinkable members such as bellows or diaphragms in such a manner that they may follow the support member 31 which moves axially together with the piston operation. A closed space 34 is formed by the shielding bodies 32, 33, support member 31 and casing 4 with the result that if the support member 31 is slid by fluid pressure, the inner pressure of the closed space 34 may fluctuate, whereby the support member 31 could be hindered in its smooth motion. In this connection, such a fluctuation of the inner pressure in the closed space 34 may be prevented by connecting said space 34 with the outside by a communicating passage 35 to allow fluid to flow through the communicating passage 35.

When the agitating device is subjected to a usual operation, materials to be agitated are put into the agitating tank 103 in an obvious manner, then the revolving shaft 1 and the agitating blades are put in motion by the power drive such as electric motor 102 for agitation purpose. At this time, cooling liquid is introduced from the flushing inlet port 81. In order to maintain and improve the sterility within the agitating tank 103, it is preferable that sterilized distilled water be used as cooling liquid. The introduced distilled water passes through the spaces 82, 83 and goes outside from the flushing outlet port 84.

The pressure between the sliding faces $2a$, $3a$ of sliding rings 2, 3 is here dependent on the inner pressure of the agitating tank 103 (the pressure of the materials to be agitated), the pressure of the cooling liquid, the ratio of balance, the rotary speed of the revolving shaft, the spring pressure of the elastic body 64, etc. These values are limited within a predetermined range in order to prevent any leakage of the materials to be agitated. However, in accordance with the present invention, the pressure between the sliding faces $2a$, $3a$ may be controlled by the foregoing controlling mechanism. That is, if the pressure between the sliding faces is small, fluid such as air is supplied from the fluid passage 65 for pressure increase to the base end side of the piston 6 in the cylinder 61, applying to the piston 6 pressure directed to the top end side. Thus, pressure extending in a direction in which the rotary ring 2 is approached is applied to the fixed ring 3 with the consequence that the pressure between the sliding faces $2a$, $3a$ will rise. Then, the air on the top end side of the piston 6 flows out through the outlet port 67. By contraries, when the pressure between the sliding faces $2a$, $3a$ is lowered, fluid such as air is supplied from the fluid passage 66 for pressure decrease to the leading end side of the piston 6 in the cylinder 61 to apply to the piston 6 a pressure directed to the leading end side.

If the fluid such as air is supplied from the fluid passage 66 for pressure decrease to the leading end side of the piston 6 in the cylinder 61 to apply pressure heading for the leading end to the piston 6, the outlet port 67 must be closed by a valve and the like (not shown).

When the materials being agitated or sealing fluid are discharged after the agitation has completed, the discharge passage (not shown) provided in the agitating tank 103 may be used. Alternatively, said controlling mechanism is used to lower the pressure between the sliding faces $2a$, $3a$ (and additionally, to form a space between the sliding faces $2a$, $3a$), and then, the sealing fluid may be flown from the agitating tank 103, passing through the space between both sliding rings 2, 3 and the spaces 82, 83 until they are discharged from the flushing outlet port 84 to the outside, or an arrangement may be made such that some of the sealing fluids can be sent away from the flushing inlet port 81 via the space 82 outward.

Cleaning of the device may be done in the following manner. First, when the agitating tank 103 and the mechanical seal are cleaned at the same time, during or after cleaning of the interior of the tank, said controlling mechanism is used to lower the pressure between the sliding faces 2a, 3a (and additionally, to form a space between the sliding faces 2a, 3a) and then, the used cleaning liquid may be discharged from the agitating tank 103, passing through the spaces between both sliding rings 2, 3 and the spaces 82, 83 until they are evacuated from the flushing outlet port 84 outward, or some of the used cleaning liquid may be discharged from the flushing inlet port 81 via the space 82 to the outside. Such a discharging operation for the cleaning liquid may also play a part to clean the interior of the mechanical seal.

In the event that the interior of the agitating tank 103 and the mechanical seal are cleaned separately, the cleaning liquid is put into the agitating tank 103 for washing, and then, the used cleaning liquid is introduced from the flushing inlet port 81 and discharged from the flushing outlet port 84. The sliding faces 2a, 3a may be also cleaned by discharging the cleaning liquid which has been used for cleaning the interior of the agitating tank 103 through the passages (from 81 to 84) within the mechanical seal.

Sterilization may be carried out in two kinds of ways; the one way is to sterilize the mechanical seal together with the agitating tank, and the other one is to do this treatment to the mechanical seal separately. In the event of the simultaneous operation, steam is introduced from the inlet port (not shown) of the agitating tank 103 under a predetermined condition. The steam may be discharged from the flushing outlet port 84 to the outside, past the spaces 82, 83 via the sliding faces 2a, 3a by lowering the pressure between the sliding faces 2a, 3a of both sliding rings 2, 3 or widening the gap between the sliding faces 2a, 3a by the use of said control mechanism. Similarly, some of the steam may be discharged from the flushing inlet port 81 via the space 82, sterilizing the interior of the mechanical seal.

In the event of sterilization of the mechanical seal portion only, as in the treatment by said cooling liquid, the passages may be sterilized by introducing steam from the flushing inlet port 81 and discharging same through the flushing outlet port 84.

This steam is preferably sterilized steam called pure steam, which should be passed through the materials being sterilized at a temperature in excess of 121° C. for over 20 minutes in accordance with SIP condition. During the sterilization, since cleaning liquid and cooling liquid are discharged respectively so as to prevent production of cold point, as described, the SIP condition may securely be met. For sterilization purpose, steam may be replaced by sterilizer.

At the time when cleaning and sterilization are conducted of the interior of the agitating tank at the same time, the controlling mechanism may act to reduce the pressure between the sliding faces 2a, 3a of the opposed sliding rings 2, 3 or to widen the gap between said sliding faces. As a result, fluid for cleaning and sterilization can be passed between the sliding faces 2a, 3a of the opposed sliding rings 2, 3, which was a difficult job in the past, thereby ensuring that the cleaning and sterilization of said portions will be surely carried out.

As set forth previously, the shielding bodies 32, 33 are put over the space between the support member 31 and casing 4 to prevent intrusion of flushing liquid, or sterilizing and cleaning liquid therebetween. Accordingly, steam never gathers around the support member 31 that is complicated in structure and inclined to produce steam pools easily, thereby resulting in solution of the problem of steam gathering.

Figure 6:
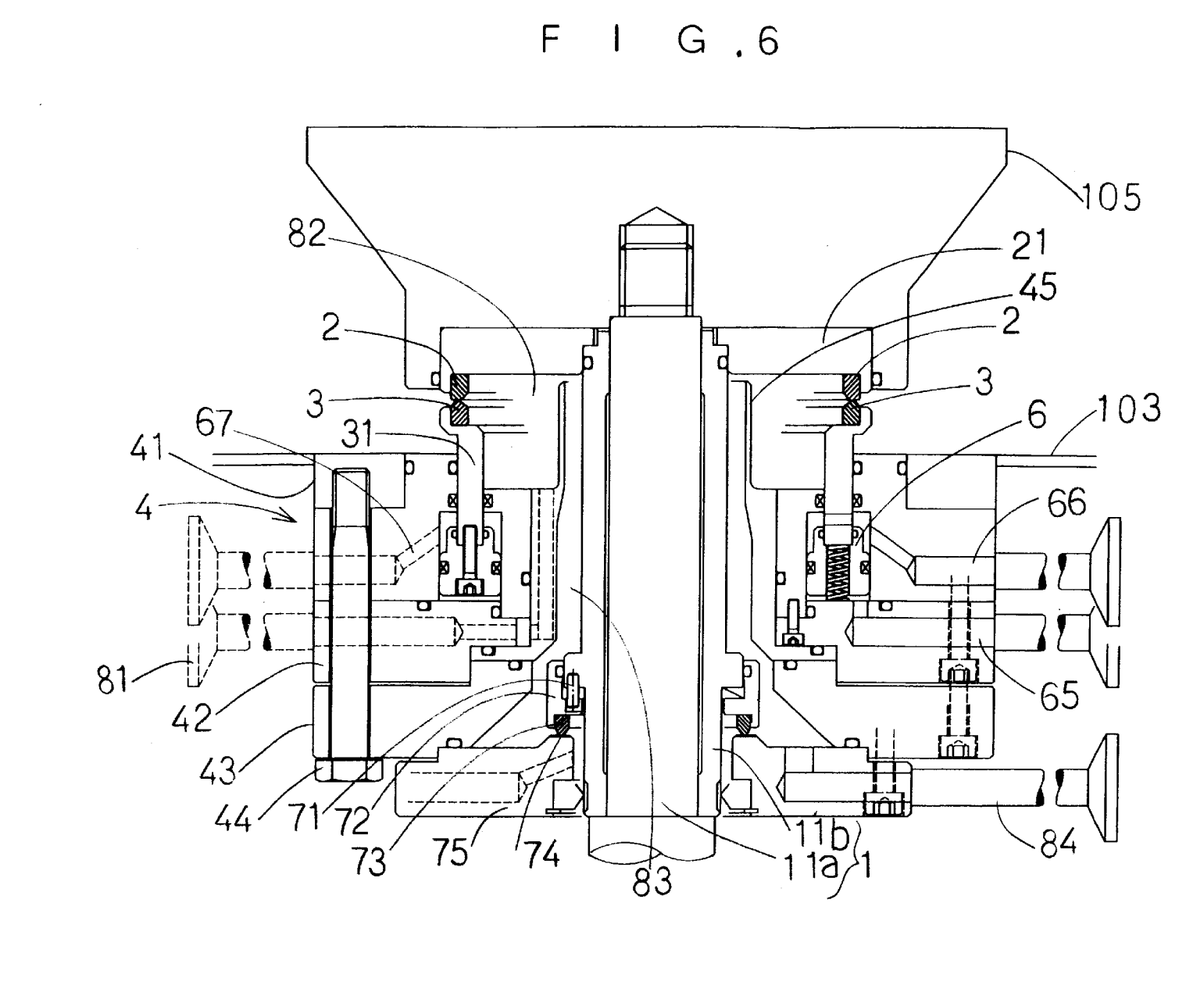
FIG. 6 is a cross sectional view showing a variation of the mechanical seal in accordance with the first embodiment of the present invention.

In the aforementioned embodiment, the mechanical seal of the agitating device which necessitates cleaning and sterilization has been detailed. The mechanical seal may be used in a variety of machineries having revolving shafts. However, it often needs no sterilization. Said embodiment is also applicable to such a case. If the problem of steam gathering can be disregarded, the shielding bodies 32, 33 may be removed from the mechanical seal in accordance with the above mentioned embodiment. FIG. 6 illustrates an example of a mechanical seal, which is different from said embodiment, however, in that it does not use shielding bodies 32, 33, thus resulting in simplification of the support member 31 in configuration, so that there is no division into the first and second support members 31a, 31b, which is another difference. The other points are the same as those in the prior example, so detailed explanations will be omitted.

In this instance, the gap between the sliding faces can be opened or closed by means of fluid pressure to control pressure, and also, any one of the sliding rings can be moved or biassed in an axial direction by the magnetic force of an electromagnet or other mechanical force or electric power.

Next, other embodiment of the present invention will be described with reference to FIGS. 7 and 8.

Figure 7:
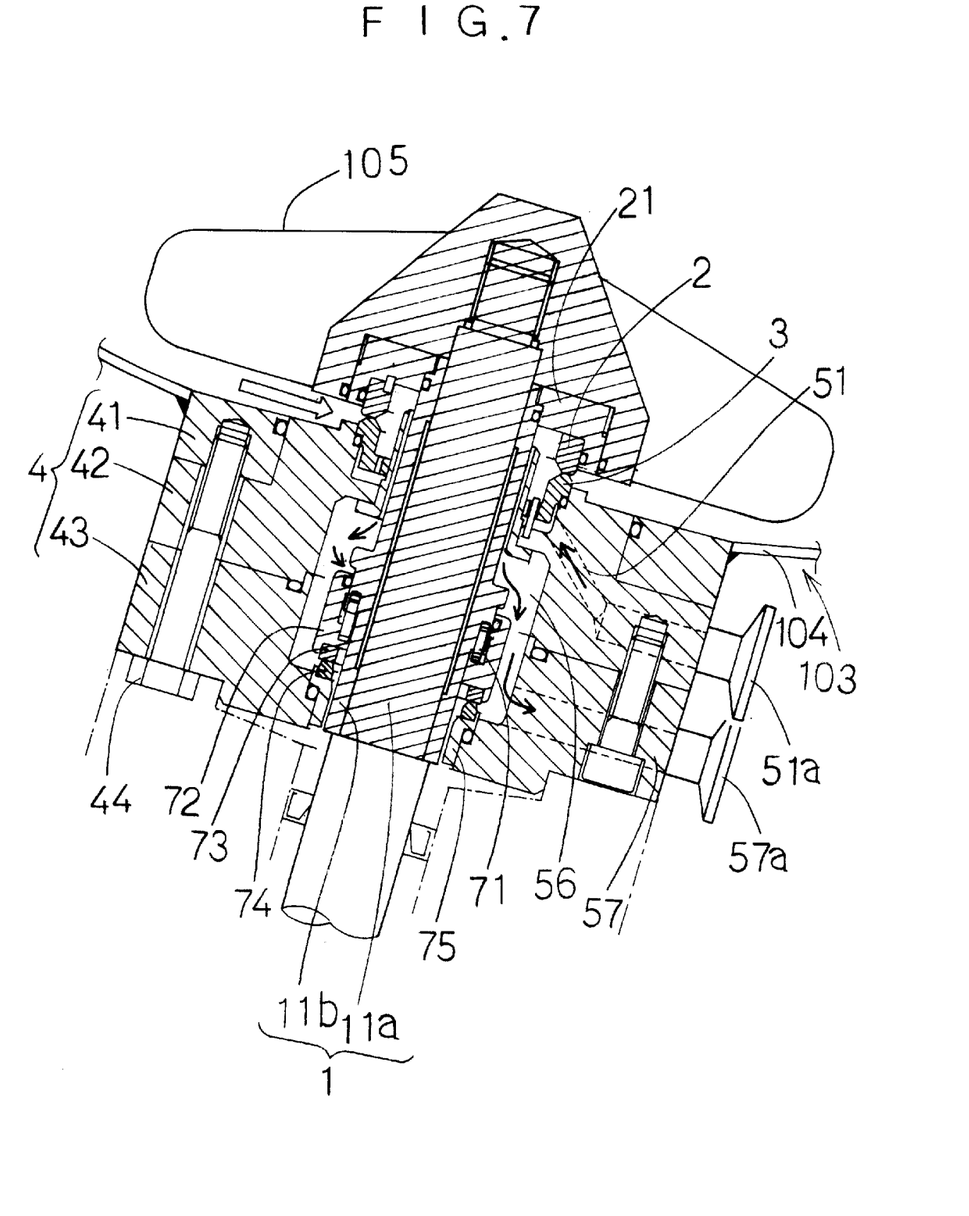
FIG. 7 is a cross sectional view of the mechanical seal in accordance with a second embodiment of the present invention.
Figure 8:
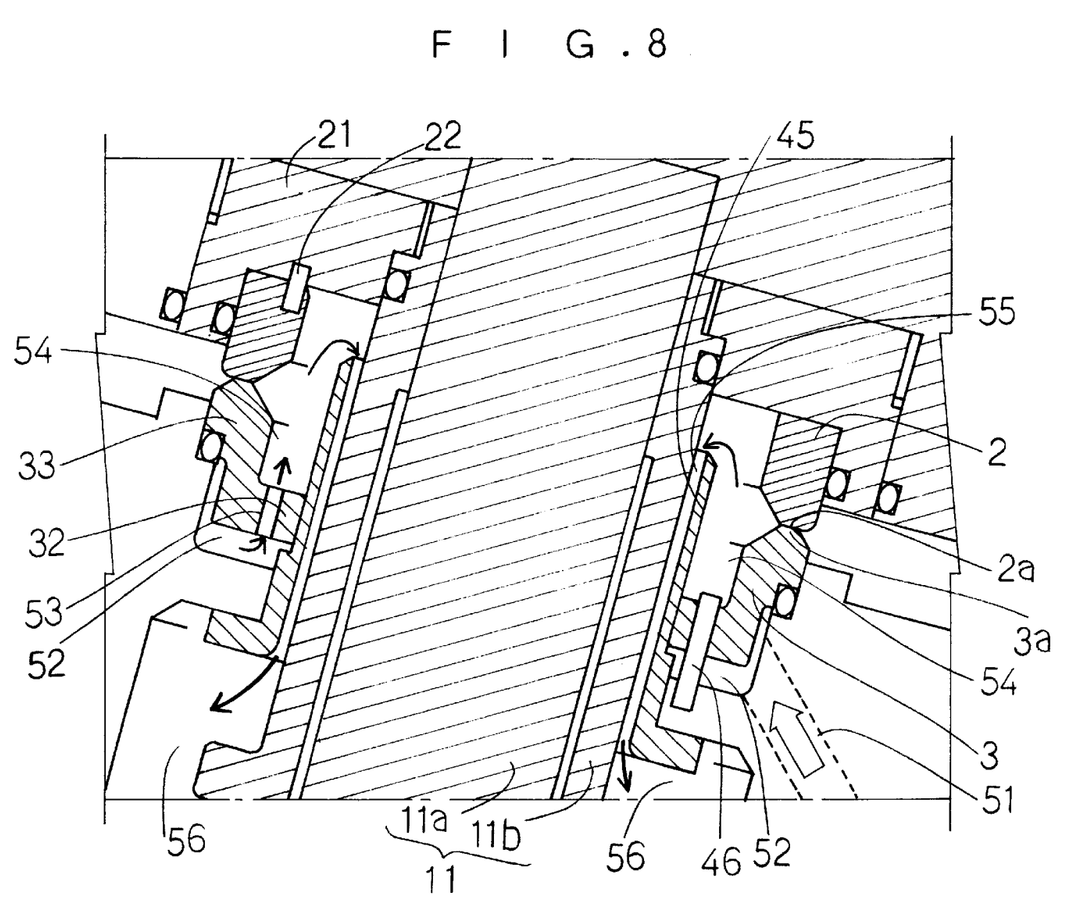
FIG. 8 is an enlarged view of said principal part.

FIG. 7 is a cross sectional view of a mechanical seal in accordance with the same embodiment, and FIG. 8 an enlarged view of a principal part of same.

The mechanical seal 101 in accordance with this embodiment also serves to seal off the gap between the revolving shaft turned by power drive such as electric motor 102 and the wall 104 of the agitating tank 103, as in the previous embodiment as shown in FIG. 5. The mechanical seal 101 is mounted out of perpendicular near the bottom of the agitating tank 103. This specific mechanical seal has functions common to those in the other embodiments of the present invention. Therefore, substantially like parts will be marked with like symbols even if their specific forms or shapes are different from those in the previous embodiments.

As shown in FIG. 7, said revolving shaft 1 comprises shank 11a and shell 11b fixed on the periphery of said shank. As both portions 11a, 11b are formed integrally, the combination of both portions will be designated and explained as revolving shaft 1 afterward, except specifically needed. The revolving shaft 1 has the leading end side received by the agitating tank 103 and the leading end threadedly engaged with agitating members such as the agitating blade 105. In the explanations of this embodiment, referring to the members, in principle, what is shown in the upper part of the drawings is taken as leading end side (the side on which the agitating blades 105 of the revolving shaft 1 is mounted), and what is shown in the lower part of the drawings (the side on which the electric motor 102 is mounted) as base end side.

The mechanical seal 101 are provided with sliding ring 2 rotatable together with the revolving shaft 1 (hereafter called rotary ring 2) and sliding ring 3 arranged opposite to said rotary ring 2 (hereafter called fixed ring 3). When the rotary ring 2 and fixed ring 3 are referred to together in the following explanations, the wording "sliding rings 2, 3" will be used.

Both sliding rings 2, 3 are a pair of rings with sliding faces 2a, 3a opposed to each other in a manner that the sliding faces 2a, 3a may rotate relatively if at least one of them (the rotary ring 2 in this case) rotates. In this instance, the rotary ring 2 sits inside the agitator tank 103, while the fixed ring 3 is placed on the casing 4 side of the mechanical seal 101 which is mounted outside the agitating tank 103. Said casing 4 contains the revolving shaft 1 and the sealing portion of the mechanical seal. Here, a single casing 4 is constituted by three different members such as first, second, and third members 41, 42, 43 connected with each other by a bolt 44. This particular structure may be properly modified, and such three members will be explained as casing 4, unless specifically needed.

Said rotary ring 2 is supported by covering 21 provided on the leading end side of the revolving shaft 1. Specifically, on the face of the leading end side of covering 21, the rotary ring 2 is connected solidly with the covering 21 by a suitable fastening means as check pin 22, with the sliding face 2a pointing toward the fixed ring 3 opposite to the base end side. The covering 21 is intended to mount the rotary ring 2 on the revolving shaft 1 so that the rotary ring 2 may rotate together with the revolving shaft 1 and to hold a liquidtight seal between both members 1, 2. In this instance, the covering 21 is threadedly engaged with the agitating blade 105, but both members 21, 105 may be separated from each other with a gap formed between them.

The fixed ring 3 sits on the base end side of the rotary ring 2. More specifically, the fixed ring 3 rests on the top end of the casing 4 mounted on the outside of the agitating tank 103, with the top end facing the interior of the agitator tank 103. This fixed ring 3 is mounted in a manner that it is slidable in an axial direction and unrotatable relative to the casing 4. In this instance, a rod 46 provided in the casing 4 is so inserted into the fixed ring 3 as to be slidable axially, thereby causing the fixed ring 3 to be slidable and unrotatable.

The fixed ring 3 has an orifice 53 formed to extend therethrough from its base end side to the leading end side. More specifically, the fixed ring 3 comprises a disc-shaped central portion 32 and a peripheral portion 33 projecting in an axial direction on the outer periphery thereof, the peripheral portion 33 being formed with sliding face 3a at the leading end face thereof. In this instance, though the orifice 53 is formed in the central portion 32, it may be provided on the peripheral portion 33 or other proper places of the fixed ring 3.

Now will be described a controlling means for controlling the pressure by which the sliding face 3a of the fixed ring 3 may abut against the sliding face 2a of the rotary ring 2, or the gap between both faces. With conventional mechanical seals, the fixed ring 3 is biassed by an elastic member such as spring. The present embodiment employs the controlling means using the fluid pressure instead of or in conjunction with said elastic member.

This specific controlling means comprises a first chamber 52 formed at the rear side (base end side) of the fixed ring 3, and a second chamber 54 provided at the front side (leading end side) of the fixed ring 3, both chambers 52, 54 communicating with each other through said orifice 53.

The first chamber 52 exists between the rear side of the fixed ring 3 and the inner wall of the casing 4, and communicates with a first passage 51 of introducing fluids from the outside of the casing 4, which opens from the casing 4 outward as a flushing inlet port 5a.

The second chamber 54 is formed between the front side (leading end side) of the fixed ring 3 and the rotary ring 2 to provide a space to hold a fluidtight seal against the agitating tank 103. In this instance, this space is divided into both sliding rings 2, 3, covering 21, and revolving shaft 1.

The second chamber 54 communicates with a second passage 55 that serves to guide fluid of the second chamber 54 to the outside. Said second passage 55 is formed by the cylindrical body 45 provided around the revolving shaft 1 at a proper distance from the latter, and located between the outer peripheral face of the revolving shaft 1 and the inner peripheral face of the cylindrical body 45. It does not matter if said cylindrical body 45 is rotatable with the revolving shaft 1, but in this instance, it is formed unrotatably in the casing 4 as a part of the latter. In other words, said second passage 55 acts to guide fluid from the second chamber 54 provided between the fixed ring 3 and rotary ring 2 to the base end side of the second chamber 54. In this instance, though the second passage 54 sits between the inner periphery of the fixed ring 3 and the revolving shaft 1, it may be removed to other position permitting fluid to flow from the second chamber 54 outward.

With the aforementioned structure, fluid such as cooling liquid flows from the first passage 51, running through the first chamber 52, orifice 53, and the second chamber 54 until they reach the second passage 55, whereby the fluid pressure in the first chamber 52 which contains the orifice 53 with the second chamber 54 will become larger than the liquid pressure in the second chamber 54. As a result, the fixed ring 3 is biassed toward the second chamber 54 (in other words, the direction of the lead end or rotary ring 2). This may cause the pressure by which the sliding face 3a of the fixed ring 3 abuts against the sliding face 2a of the rotary ring 2 to increase, or the gap between both sliding faces 2a, 3a to decrease. That is, the differential pressure between the first and second chambers 52, 54 may vary with the pressure or flow rate of fluid flowing through the passage, so that said biassing force may change to control the pressure or the gap between both sliding faces 2a, 3a.

As described above, this embodiment may control the pressure or the gap between the sliding faces 2a, 3a by positive use of the flushing liquid, being characterised by the followings. First, the controlling mechanism using the orifice 53 may enlarge the pressure of flushing liquid, thereby extending the range of pressure control. Conversely, control for obtaining a desired level of the pressure between the sliding faces 2a, 3a can be performed within a narrower extent of change in pressure of the flushing liquid than the conventional one. Consequently, it is possible to obtain a desired magnitude of pressure without recourse to any conventional pressurizing device for flushing liquid.

Furthermore, the gap between the sliding faces 2a, 3a may be opened or closed by changing the direction in which the fluid flows between the first and second chambers 52, 54 that contain the orifice 53 (specifically, from the first chamber 52 to the second chamber 54, and vice versa).

Said biassing force may be used in conjunction with the mechanical force of a spring, as in a conventional practice, but the use of fluid pressure only is advantageous in that it may not only simplify the structure but also prevent the formation of liquid pool.

Though this embodiment has an arrangement such that liquid such as cooling liquid introduced from the flushing inlet 51a is used to control the biassing force so as to give two functions to the cooling liquid, and other fluid may be passed through other passage than the one for cooling liquid or the one for controlling of biassing force.

Said second passage 55 is intended to send fluid to the outside. In this instance, the fluid from the second passage 55 starts to leave a discharge chamber 56 provided between the revolving shaft 1 on the base end side of the fixed ring 3 and the casing 4, passing through a discharge duct 57 formed in the casing 4 and flow from a flushing outlet port 57a outward.

The mechanical sealing device of the present invention can do well with said mechanical seal. In this embodiment, however, a mechanical seal device is used as a double type, having an additional mechanical seal mounted on the base end side of the fixed ring. This second mechanical seal is similar to conventional types. In brief, a spring 71, a compression ring 72 that is biassed by the spring 71, and seal ring 73 mounted on the compression spring 72 are provided on the revolving shaft side, while a maintaining ring 74 opposed to the seal ring to do sealing and an end ring 75 of supporting the maintaining ring 74 are provided on the casing 4 side. Sealing takes place between the seal ring 73 and the maintaining ring 74. In addition to this double type, a tandem type may be useful. With this type, the second mechanical seal may employ the conventional spring-biassing structure, or as in the present invention, the fluid may be used as a control means for biassing force. In this instance, though the mechanical seal in accordance with the present invention is positioned on the top end side (inside of the tank) and the conventional type of the second mechanical seal is located on the base end side (atmospheric side), such a positional relation may be the other way around. In this embodiment, the rotary ring 2 which may rotate with the revolving shaft can not move axially, but it may be so modified as to be movable in an axial direction. Similarly, the fixed ring 3 is designed to be unrotatable, but movable axially. This may be so modified as not to move axially, too. In this instance, the controlling means is provided in the fixed ring 3, but it may be positioned in at least one of the sliding rings 2, 3.

Now, the agitating device using said mechanical seal and the method for using the former will be described. The agitating device has agitating tank 103 to which said mechanical seal is attached. As sealing takes place between the revolving shaft 1 and the tank wall 104, the agitating blades 105 are tuned by the power drive such as electric motor 102 to mix and agitate materials being agitated. As described previously, a series of passages constituted by the first passage 51 through the discharge duct 57 may serve both as passage for cooling liquid and passage for pressure control fluid. In this instance, these passages may also play the role of sterilization and cleaning.

These passages are so inclined as to avoid the formation of liquid pools therewithin, communicating with at least one of the inlet port 51a and outlet port 57a, and the mechanical seal 101 is provided out of perpendicular in the vicinity of the bottom of the agitating tank 103.

Generally, when the agitating device is operated, the cooling liquid is introduced through the flushing inlet port 51a. The cooling liquid used is preferably a sterilized distilled water in order to keep and improve sterility in the agitating tank 103. The introduced cooling liquid passes through the first passage 51, the first chamber 52, orifice 53, the second chamber 54, the second passage 55, discharge chamber 56, and the discharge duct 57, and flows from the flushing outlet 57a outward. During this operation, as described previously, there arises a differential pressure between the first and second chambers 52, 54 between which the orifice is located, the fixed ring 3 is biassed toward the opposed rotary ring 2 by a high fluid pressure in the first chamber 52, and then, the pressure between both sliding faces 3a, 2a goes up to ensure that a reliable sealing will be done. This may prevent any leakage of sealing fluid or materials being agitated put into the agitating tank 103 for drugs. Said pressure between the sliding faces may be increased by increasing the flow rate and pressure of the cooling liquid as needed, thereby obtaining higher sealability. If lower sealability will do, the flow rate and fluid pressure may be kept at a low level in operation.

After the completion of agitation, the materials to be agitated or sealing fluid may be evacuated from a discharge passage (not shown) provided in the agitating tank 103. Alternatively, the flow of the cooling liquid is stopped, thereby reducing the differential pressure between the first and second chambers 52, 54 to zero and lowering the pressure between the sliding faces 2a, 3a as well, and then, the sealing fluid may be discharged from the agitating tank 103, passing between both sliding rings 2, 3, past the second chamber 54, the second passage 55, discharge chamber 56, discharge duct 57, and go out of the flushing outlet port 57a outward. Some of the fluids may be discharged from the flushing inlet port 51a outward after it has passed through the orifice 53, the first chamber 52, and the first passage 51.

For cleaning of the device, the following manner may be employed. First, when the agitating tank 103 and the mechanical seal are cleaned at the same time, the cleaning liquid is put into the agitating tank 103 to clean the interior of the tank by agitating the cleaning liquid as needed. This cooling liquid is stopped to flow during or after cleaning. This may reduce the differential pressure between the first and second chambers 52, 54 to zero, thereby lowering the pressure or opening the gap between the sliding faces 2a, 3a, with the consequence that the cleaning liquid goes out of the agitating tank 103, passing between the sliding faces 2a, 3a of the sliding rings 2, 3, then past the second chamber 54, the second passage 55, the discharge chamber 56, and flow from the flushing outlet port 57a outward. Similarly, some of the cooling liquids are evacuated from the flushing outlet port 51a via the first chamber 52 and the first passage 51, thus resulting in cleaning of the interior of the mechanical seal.

If the interior of the agitating tank 103 and the mechanical seal are cleaned separately, the cleaning liquid is put into the agitating tank 103 to clean it, and is introduced from the flushing inlet port 51a and discharged through the flushing outlet port 57a. The cleaning liquid within the agitating tank 103 may be evacuated through the passages (from 51a to 57a) provided in the mechanical seal.

Additionally, if the cleaning operation starts with the mechanical seal portion, the cooling liquid is poured out of the flushing outlet port 57a, so that a pressure difference will be produced by the orifice 53. Namely, the pressure within the second chamber 54 becomes larger than that of the first chamber 52 by the making the fluid flow from the second chamber 54 to the first chamber 52. This may cause the pressure between sliding faces 2a, 3a to reduce or the gap between the latter to open, thereby allowing passage of the cleaning liquid between the sliding faces 2a, 3a to clean them. The cleaning liquid is separated into two portions to take two different courses; one portion flowing from the sliding faces into the agitating tank, and the other one passing through the second chamber 54 and then, the first chamber, and going out of the flushing inlet port 51a.

In accordance with the present invention, now that the passages may be used for the reversed course, the terms for inlet port and outlet port for fluid to pass through, such as flushing inlet port and flushing outlet port as seen all through the specification of this application should be understood to have opposite meanings in view of the direction in which fluid flows, namely the inlet port turns into the outlet port and vice versa.

There are two different manners in sterilization of the mechanical seal; the one is to do it concurrently with the sterilization of the agitating tank, and the other one is to do it separately. In the concurrent operation, steam is introduced from an inlet port (not shown) of the agitating tank 103 under given conditions. At this time, no fluid is passed through the passages (from 51a to 57a) within the mechanical seal. As a result, the pressure between the sliding faces 2a, 3a of both sliding rings 2, 3 will decrease, and the steam passes between both sliding faces 2a, 3a, past the second chamber 54, the second passage 55, discharge chamber 56, the discharge duct 57, and goes from the flushing outlet port 57a outward. Similarly, some of the steam pass through the orifice 53, the first chamber 52, the first passage 51, and go from the flushing inlet port 51a outward, thereby resulting in sterilization of the interior of the mechanical seal.

In the event of the sterilization of the mechanical seal portion only, as in the above case, sterilization of the sliding faces 2a, 3a may be achieved by introducing steam from the flushing outlet port 57a, while the passages may be sterilized by discharging the steam from the agitating tank 103 and the flushing inlet port 51a.

This steam is preferably sterilized steam called pure steam, which should be poured at more than 121° C. for over 20 minutes in accordance with SIP condition. During the sterilization, since cleaning or cooling liquid is discharged so as to prevent the occurrence of cold points, as described before, the SIP condition may securely be met. For sterilization purpose, steam may be replaced by sterilizing liquid.

In said cleaning or sterilization, by flushing cooling or sterilizing liquid from the flushing outlet port to the inlet port rather than introduce said liquid from the flushing inlet port, the pressure or the gap between the sliding faces 2a, 3a of the opposed sliding rings 2, 3 may be reduced or widened. As a result, cooling or sterilizing liquid can be passed through the sliding faces 2a, 3a of the opposed sliding rings 2, 3, though this was a difficult job, to ensure that reliable cooling or sterilization of said portions will be carried out.

When embodying the present invention, the structure involving the cylinder in the first embodiment may be combined with the structure using the orifice in the second embodiment.

The first through ninth inventions provide mechanical seals which are capable of facilitating control of the pressure between the sliding faces of the sliding rings. Said mechanical seal can control the pressure or the gap between the sliding faces 2a, 3a within the range wider than that within which said pressure may change independent of or under the influence of the pressure of sealing fluid or flushing liquid. Additionally, the sliding faces of the opposed sliding rings can be surely cleaned or sterilized without the necessity of disassembling the device.

In the third invention of this application, in particular, the biasing force may be adjusted by applying a positive or negative pressure of control fluid in an axial direction of the revolving shaft of the mechanical seal, that is, by varying the pressure of control fluid. Consequently, in operation as well as at rest, the pressure or the gap between the sliding faces 2a, 3a may be regulated.

In the fourth invention, the passage for control fluid has nothing to do with the pressure of flushing fluid because it is made independent of the passage for flushing fluid, thus resulting in no communication between both passages. If the passage of flushing fluid necessitates cleaning or sterilization, there will be no need to subject the passage for control fluid to such an operation on the grounds that both passages have no longer any relation with each other.

In accordance with the fifth invention, a reliable adjustment of the pressure or the gap between the sliding faces 2a, 3a may be achieved by transmitting fluid pressure via the piston 6 accurately.

In accordance with the sixth invention, a reliable adjustment of the pressure or the gap between the sliding faces 2a, 3a may be achieved by transmitting the combination of the pressure of the elastic body and the fluid pressure to the sliding rings via the piston 6.

In accordance with the seventh invention, the pressure or the gap between the sliding faces 2a, 3a of the opposed sliding rings may be reduced or widened by means of the differential pressure between the first and second chambers 52, 54 with the orifice 53 interposed between said both chambers.

In accordance with the eighth invention, the provision of orifice 53 makes it possible to perform pressure adjustment in a greater scale than the amount of change in flushing liquid pressure, and additionally, the differential pressure originated in the orifice 53 may be also reversed by changing the direction of the orifice 53 in which the flushing liquid flows.

The tenth through twelfth inventions could provide an agitating device in which even in the presence of pressure change of fluid in the agitating tank, the pressure or the gap between the sliding faces of sliding rings can be controlled by the control mechanism of the mechanical seal. Also, the opposed sliding faces of the mechanical seal can be cleaned or sterilized together with the agitating tank without disassembling the elements.

In the eleventh invention, in particular, the formation of liquid pools in the passages enables prevention of occurrence of cold points, thereby permitting reliable sterilization.

In the twelfth invention, biasing force which has been adjusted by the control fluid introduced from the outside of the agitating tank 103 is impressed to the sliding ring 3 on the fixed part to control the pressure or the gap between the sliding faces 2a, 3a irrespective of the pressure within the agitating tank 103.

The thirteenth invention could provide a rotary apparatus using the mechanical seal in accordance with any of the first through ninth inventions and advantageous to adjustment of the pressure between the sliding faces, CIP (cleaning in position), or SIP (sterilization in position).

The fourteenth invention could provide an agitating process in which cleaning or sterilizing liquid is passed through the sliding faces 2a, 3a of the opposed sliding rings with the pressure or the gap between the sliding faces 2a, 3a of the opposed sliding rings held at a lower level or rendered wider so as to securely clean and sterilize the sliding faces 2a, 3a.

What is claimed is:

1. A seal assembly for providing a liquid-tight seal about a revolving shaft, the seal assembly comprising:

at least two relatively rotatable rings for disposition about the shaft, the rings having sliding faces confronting each other;

a control mechanism including a piston coupled to one of the rings and selectively operable to (1) urge the one ring toward and away from the other ring between (a) a first position in which the sliding faces engage each other and pressure is established between the sliding faces and (b) a second position in which the sliding faces are separated by a gap and (2) control respectively (a) the pressure of the sliding faces against each other and (b) the magnitude of the gap between the sliding faces, the piston having opposed faces exposed to fluid pressure in two chambers separated by the piston; and means for selectively introducing fluid under pressure into the chambers to thereby create a force on the piston that urges the one ring toward and away from the other ring.

2. The seal assembly as recited in claim 1, and further comprising an elastic body for urging at least one of the rings against the other ring.

3. The seal assembly as recited in claim 1, and further comprising a mechanism for supplying a flushing liquid to the rings.

4. The seal assembly as recited in claim 1, wherein:

the piston includes an orifice extending through the piston and providing communication between the two chambers; and the means for selectively introducing fluid under pressure into the chambers creates a flow through the piston between the chambers to thereby establish a pressure differential on the opposed faces of the piston that creates the force on the piston.

5. The seal assembly as recited in claim 4, wherein:

the fluid is a liquid; and the rings are exposed to the fluid in one of the chambers, whereby the fluid can perform at least one of a flushing and a sterilization operation.

6. In combination, an agitating device including (1) an agitating tank, (2) a motor-driven shaft having an end thereof extending into the tank, (3) an agitating member carried on the end of the shaft within the tank and (4) a seal assembly providing a liquid-tight seal about the end of the shaft within the tank, the seal assembly comprising:

at least two relatively rotatable rings disposed about the shaft, the rings having sliding faces confronting each other; and a control mechanism including a piston coupled to one of the rings and selectively operable to (1) urge the one ring toward and away from the other ring between (a) a position in which the sliding faces engage each other and pressure is established between the sliding faces and (b) a position in which the sliding faces are separated by a gap and (2) control respectively (a) the pressure of the sliding faces against each other and (b) the magnitude of the gap between the sliding faces, the piston having opposed faces exposed to fluid pressure in two chambers separated by the piston; and means for selectively introducing fluid under pressure into the chambers to thereby create a force on the piston that urges the one ring toward and away from the other ring.

7. The combination as recited in claim 6, and further comprising:

passages within the seal assembly for conveying at least one of a flushing and a sterilizing liquid to the rings, the passages being inclined so as to inhibit the formation of pools therein;

an inlet port for supplying the liquid to the passages; and an outlet port for exhausting the liquid from the passages.

8. The combination as recited in claim 6 wherein:

the one of the rings urged by the control mechanism toward and away from the other ring is joined to the tank and is non-rotatable; and the other ring is joined to the shaft so as to revolve therewith.

9. An agitation process performed in an agitation tank wherein an end of a motor-driven shaft extends into the tank and an agitating member is carried on the end of the shaft within the tank, the process further comprising the following steps:

disposing a seal assembly about the end of the shaft within the tank to thereby provide a liquid-tight seal about the end of the shaft within the tank, the seal assembly comprising at least two relatively rotatable rings disposed about the shaft and having sliding faces confronting each other;

providing a control mechanism including a piston coupled to one of the rings and having opposed faces exposed to pressure in two chambers separated by the piston;

selectively operating the control mechanism by selectively introducing fluid under pressure into the chambers to thereby create a force on the piston to (1) urge the one ring toward and away from the other ring between (a) a position in which the sliding faces engage each other and pressure is established between the sliding faces and (b) a position in which the sliding faces are separated by a gap and (2) control respectively (a) the pressure of the sliding faces against each other and (b) the magnitude of the gap between the sliding faces;

performing agitation of material within the tank when the faces of the rings engage each other; and conveying at least one of a flushing and a sterilizing liquid to the rings when the faces of the rings are separated.

* * * * *

UNITED STATES PATENT AND TRADEMARK OFFICE
CERTIFICATE OF CORRECTION

| | |
|---|---|
| PATENT NO. | : 6,517,077 B1 |
| APPLICATION NO. | : 09/385839 |
| DATED | : February 11, 2003 |
| INVENTOR(S) | : Masakazu Enomura |

It is certified that error appears in the above-identified patent and that said Letters Patent is hereby corrected as shown below:

On the cover page of the patent, change

"(75)   Inventor: Shinichi Enomura, Osaka (JP)"

to

--(75)   Inventor: Masakazu Enomura, Osaka (JP)--.

Signed and Sealed this
Twenty-third Day of August, 2011

David J. Kappos
*Director of the United States Patent and Trademark Office*